United States Patent
Çetinkaya et al.

(10) Patent No.: US 11,246,078 B2
(45) Date of Patent: Feb. 8, 2022

(54) SYSTEM AND METHOD FOR OPTIMIZED MOBILITY MANAGEMENT IN A WIRELESS NETWORK

(71) Applicant: Verizon Patent and Licensing Inc., Basking Ridge, NJ (US)

(72) Inventors: Egemen K. Çetinkaya, Hillsborough, NJ (US); Frank Jager, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/840,983

(22) Filed: Apr. 6, 2020

(65) Prior Publication Data

US 2021/0314839 A1  Oct. 7, 2021

(51) Int. Cl.
| | |
|---|---|
| *H04W 4/00* | (2018.01) |
| *H04W 36/32* | (2009.01) |
| *G01S 19/05* | (2010.01) |
| *H04W 4/40* | (2018.01) |
| *H04W 4/02* | (2018.01) |
| *H04W 84/04* | (2009.01) |

(52) U.S. Cl.
CPC ............ *H04W 36/32* (2013.01); *G01S 19/05* (2013.01); *H04W 4/027* (2013.01); *H04W 4/40* (2018.02); *H04W 84/042* (2013.01)

(58) Field of Classification Search
CPC ....... H04W 36/32; H04W 4/40; H04W 4/027; H04W 84/042; G01S 19/05
USPC ........................................................ 370/329
See application file for complete search history.

(56) References Cited

U.S. PATENT DOCUMENTS

| | | | | |
|---|---|---|---|---|
| 6,633,554 | B1* | 10/2003 | Dalal | H04W 36/18 370/331 |
| 7,050,804 | B1* | 5/2006 | Wurtenberger | H04W 36/32 370/331 |
| 10,420,170 | B2* | 9/2019 | Garg | H04W 36/0085 |
| 2009/0312024 | A1* | 12/2009 | Chen | H04W 36/04 455/437 |
| 2010/0093354 | A1* | 4/2010 | Agashe | H04W 36/04 455/436 |
| 2020/0249039 | A1* | 8/2020 | Lassoued | G01C 21/34 |
| 2020/0396644 | A1* | 12/2020 | Matsumoto | H04W 28/0289 |

(Continued)

OTHER PUBLICATIONS

Peters, Kevin et al., "A Geographical Routing Protocol for Highly-dynamic Aeronautical Networks," Proceedings of the IEEE Wireless Communications and Networking Conference (WCNC), Mar. 2011, pp. 492-497, Cancun, Mexico.

*Primary Examiner* — Amancio Gonzalez

(57) ABSTRACT

A mobility management optimizing function in a wireless network receives geographic location information associated with a user equipment device (UE), wherein the UE is associated with a vehicle and generates a predictive handover schedule based on the received location information. Handover processing is initiated based on the predictive handover schedule, wherein initiating the handover processing comprises: transmitting one or more handover initiation messages to a plurality of cell sites in a service provider wireless network at times based on the predictive handover schedule, wherein, upon receipt of a handover initiation message, the plurality of cell sites will initiate handover processing based on the received handover initiation message.

20 Claims, 8 Drawing Sheets

(56) References Cited

U.S. PATENT DOCUMENTS

2021/0029580 A1\* 1/2021 Gupta ................... H04W 24/02
2021/0099932 A1\* 4/2021 Khanka ................ H04B 17/318

\* cited by examiner

SYSTEM AND METHOD FOR OPTIMIZED MOBILITY MANAGEMENT IN A WIRELESS NETWORK

BACKGROUND

Next Generation mobile networks, such as Fifth Generation (5G) mobile networks, are expected to operate in the higher frequency ranges, and such networks are expected to transmit and receive in the gigahertz (GHz) band with a broad bandwidth near 500-1,000 megahertz (MHz). The expected bandwidth of Next Generation mobile networks is intended to support download speeds of up to about 20 gigabits per second. The proposed 5G mobile telecommunications standard, among other features, operates in the millimeter wave bands (e.g., 14 (GHz) or higher), and supports more reliable, massive machine communications (e.g., machine-to-machine (M2M), Internet of Things (IoT), etc.). Next Generation mobile networks, such as those implementing the 5G mobile telecommunications standard, are expected to enable a higher utilization capacity than current wireless systems, permitting a greater density of wireless users, with a lower latency. Next Generation mobile networks, thus, are designed to increase data transfer rates, increase spectral efficiency, improve coverage, improve capacity, and reduce latency.

Millimeter wave (mmWave) frequencies are proposed to be used in advanced wireless systems, such as, for example, 5G systems. mmWave frequencies are limited in coverage, but are able to penetrate buildings more than lower frequency waves. Due to these limitations, cell sites containing the system antennas need to be close to the network user to make up for the signal losses. This requires a greater cell density in the advanced wireless systems, relative to current systems. Additionally, to satisfy the improved utilization capacity requirements of advanced wireless systems, a greatly increased number of antennas, relative to current systems (e.g., Fourth Generation (4G) systems), will need to be deployed to support high bandwidth connections to each wireless device. In current wireless systems, the typical distance between adjacent antennas is about 1.5-3.2 kilometers (km). In contrast, for proposed advanced wireless systems, such as 5G systems, the distance between adjacent antennas may need to be reduced to about 200-300 meters. Therefore, next generation wireless systems may need as many as one hundred times the number of antennas as compared to current wireless systems.

DETAILED DESCRIPTION OF THE PREFERRED EMBODIMENTS

Figure 1:
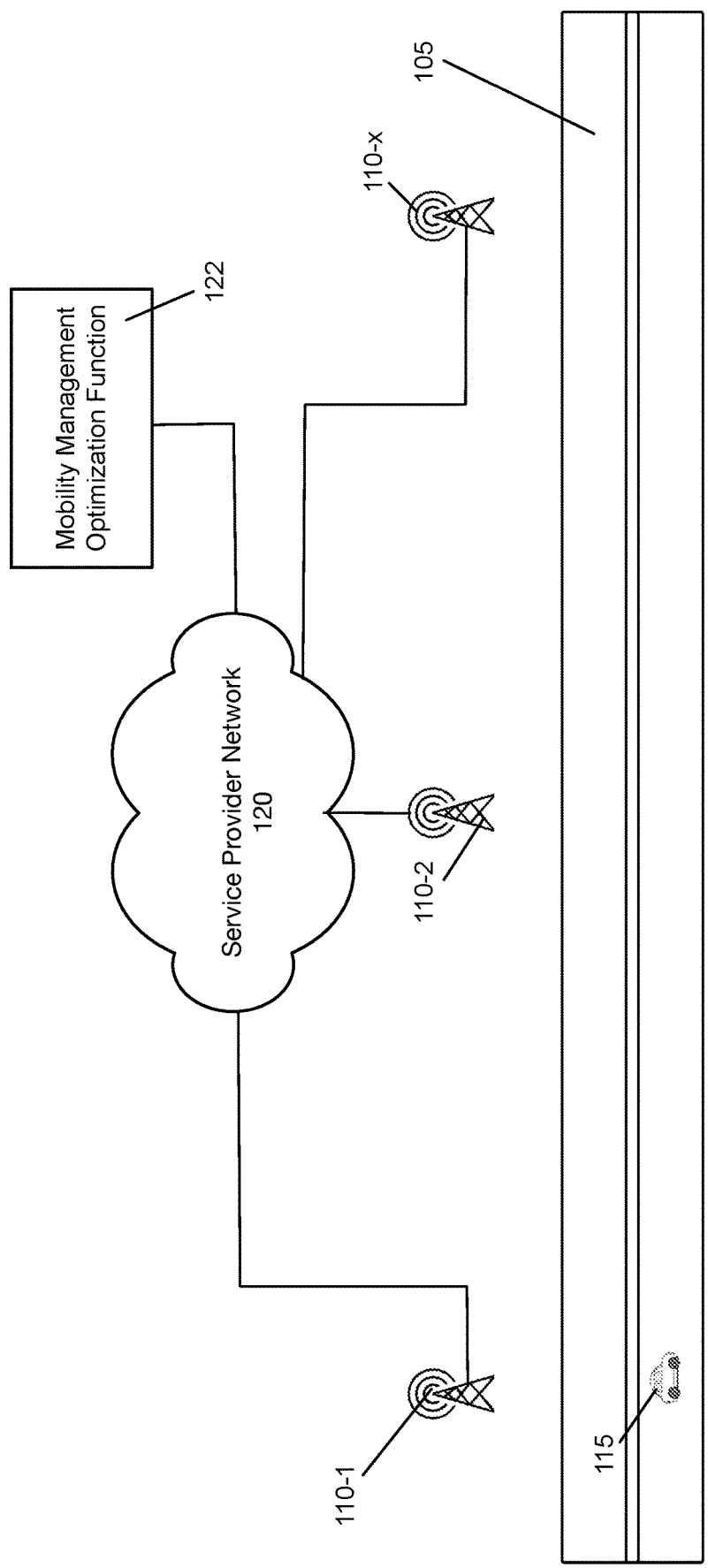
FIG. 1 illustrates an overview of a system consistent with embodiments described herein.

The following detailed description refers to the accompanying drawings. The same reference numbers in different drawings may identify the same or similar elements. The following detailed description does not limit the invention, which is defined by the claims.

Fifth Generation (5G) radio deployments at mmWave frequencies require more line of sight antenna installations as compared to current Fourth Generation (4G) radio deployments. Additionally, 5G cell deployments will be much denser than current 4G cell deployments, and mmWave 5G antennas will be much smaller and more directional than 3G or 4G antennas. Furthermore, 5G antennas are expected to be deployed on poles, lamp posts, bus stops, and other more open locations, that are more susceptible to environmental and human factors that may negatively affect the deployment environment of the antennas.

One of the promising applications to make use of such 5G mmWave frequencies revolves around V2X (Vehicle-to-Everything) technology in which 5G systems provide the platform for the smart vehicles to be connected to the network, taking advantage of the access to the network for in-car entertainment as well as providing necessary connectivity to support the vehicle safety, navigation, and diagnostic needs. In-car entertainment applications expect to be supported by as much as 4 gigabits per second (Gb/s) instant data rate. A 5G mobile network can accomplish such a rate via broadband spectrum solutions, such as mmWave spectrum (e.g., 24 GHz, 29 GHz, 38 GHz, etc.).

However, because the propagation characteristics of mmWave are such that the usable coverage of mmWave cell rarely exceeds 500 m (subject to shadowing impact of vehicles and terrain/clutter limitations) and vehicular speeds alongside the highways can exceed 80 miles per hour (approx. 36 m/s), frequent mobility management processing becomes necessary (e.g., intra-cell and inter-cell handovers), consequently leading to increased 5G control channel load and demands on system processing capacity.

Traditional wireless network mobility management mechanisms are based on user equipment device measurements (e.g., relative downlink signal strength) and clear delineation (e.g., using hysteresis) between the serving and adjacent cells' signal strengths and/or quality levels. However, this process takes relatively long time and uses many control channel resources to accomplish. Consequently, a deleterious number of handover failures, radio link failures, or complete device disconnects may occur, leading to a dramatic degradation of user perceived performance.

In addition, for 5G cell sites, 5G mmWave cell solutions support beamforming, in which the coverage area of the cell is internally divided into a number of areas (e.g., 8, 16, 32, etc.) for separate antenna beams to improve the coverage and peak rate for users, as well as reduce overall system interference. A user equipment device in a connected mode is typically served within one beam at any point of time and, as it moves (e.g., alongside the highway), the device is expected to switch the beams. By way of example, assuming a cell site provides eight discrete antenna beams in its coverage area alongside a highway, the user equipment device may change the beam to which it connects as much as eight times within the cell site. Further assuming that the cell site has a coverage range of 500 meters and the user equipment device is traveling at 36 meters per second, it may be necessary to change beams within the cell site coverage area approximately every 1.75 seconds.

Because of the speed of the device and the number of necessary beams at cell sites, the device may not trigger the required measurements on time to initiate successful, uninterrupted intra- and inter-cell site handovers when the serving cell site or beam coverage is still reliable, thus degrading the performance or losing the radio link. The latter may lead to a radio link failure (RLF). Further, the moving device may trigger frequent control channel activity to support beam switching and mobility handovers that contribute to the device's overheating issues, possibly leading to the device shutdown. In addition, 5G mmWave mobile network may become overloaded with control messages that consume valuable network resources.

Exemplary embodiments described herein implement an optimized mobility management mechanism when the network determines that a device is entering a predictable, high speed environment, such as a high-speed roadway or rail line. In particular, a predictive handover schedule may be generated and implemented at a 5G node based on, for example, the location, speed, and direction of travel of the user equipment device. Based on the handover schedule, mobility processing may be performed to transition the user equipment device between cell sites without requiring user equipment-based measurement control signaling, or decision making.

Although embodiments described herein relate generally to in-vehicle user equipment devices, the methods and systems described may be similarly applied to any user equipment devices that travel a known or predictable path of travel. For example, navigation to a predefined location, historical travel patterns, etc.

FIG. 1 illustrates an overview of a system 100 consistent with embodiments described herein. As shown, system 100 includes a roadway 105, cellular site devices 110-1 to 110-*x* (referred to collectively as cell sites 110) positioned proximate to roadway 105, a user equipment (UE) device 115 associated with a vehicle traveling on roadway 105, and a service provider network 120 operatively coupled to the cell sites 110.

Consistent with embodiments shown herein, service provider network 120 includes a mobility management optimization function 122 configured to determine when UE device 115 has entered roadway 105 and optimize intra-cell site and inter-cell site handover processing based on such a determination. For example, service provider network 120 may retrieve or otherwise calculate vehicle information including at least location and other telemetry information associated with UE device 115, such as acceleration and velocity information, direction of travel information, etc. When it is determined that UE device 115 is entering roadway 105 based on the retrieved or calculated vehicle information, mobility management optimization function 122 may determine a direction and rate of travel of UE device 115 as well as additional environmental information, such as historical road traffic patterns, etc., and may predict handover requirements for UE device 115. Mobility management optimization function may execute the predicted handovers as UE device 115 travels on roadway 105, for optimal device-to-network communication.

As identified above, in traditional mobility management processing, certain signals may be exchanged between UE device 115 and cell sites 110 prior to a handover. For example, prior to a traditional inter-cell site handover, beam reference signals (BRS) or other reference signals may be received by UE device 115 from each of a source cell site 110 and a target cell site 110. In response, the UE device may generate a measurement report (MR) and transmit the MR to the source cell site 110, which then, based on the content of the MR, initiates the handover to the target cell site 110. Unfortunately, as identified above, in some 5G mmWave implementations involving high speed UE devices, such an overhead in handover processing and signaling may have deleterious effects on network performance.

Accordingly, consistent with embodiments described herein, mobility management optimization function 122 may predict and initiate execution of handovers while the UE device 115 remains on roadway 105, thus removing the overhead signaling and processing required in traditional handovers.

Figure 2:
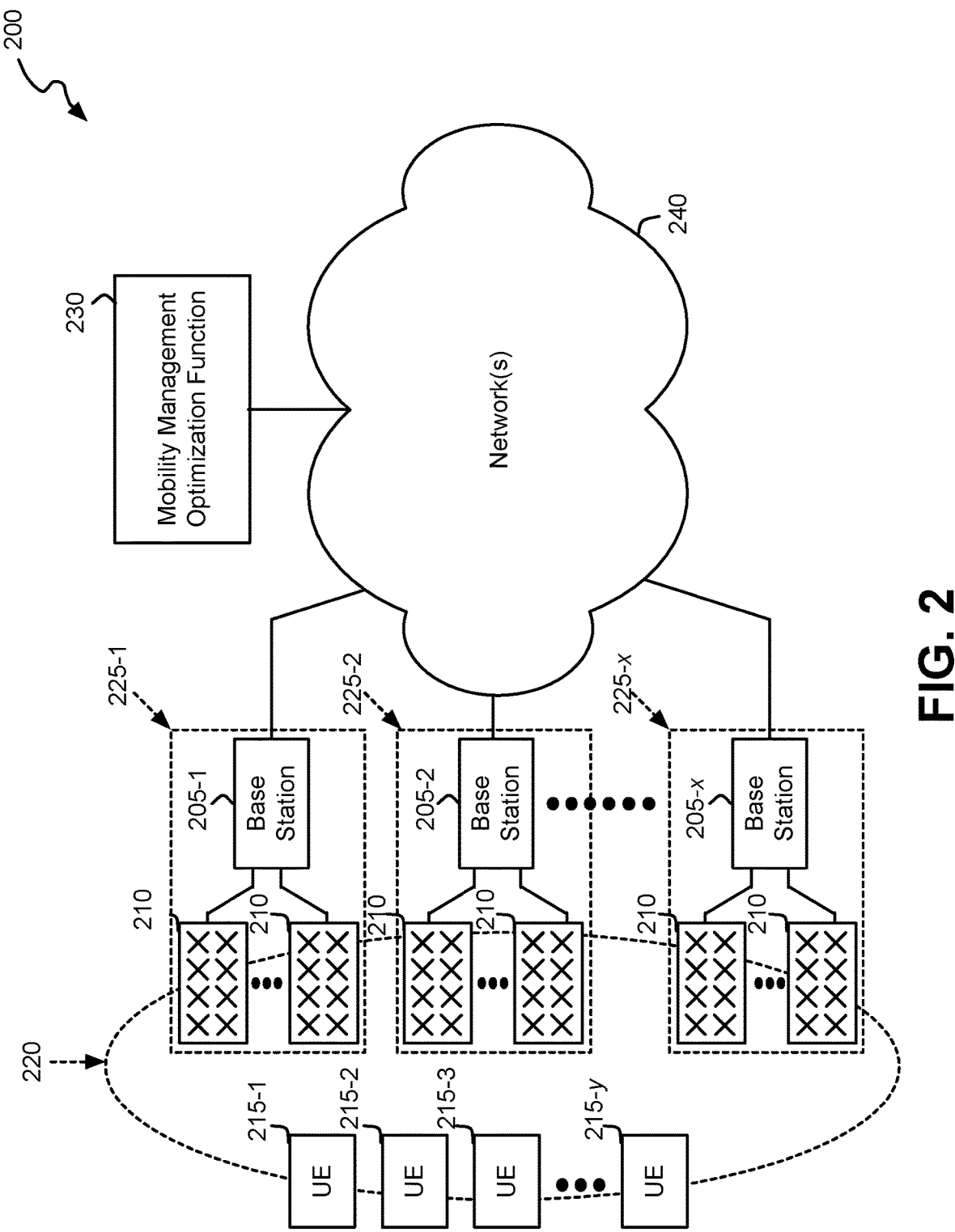
FIG. 2 illustrates overview of an exemplary network environment in which systems and methods described herein may be implemented.

FIG. 2 illustrates overview of an exemplary network environment 200 in which systems and methods described herein may be implemented. As shown, network environment 200 includes base stations 205-1 through 205-*x*, antenna arrays 210, UE devices 215-1 through 215-*y*, a mobility management optimization function 230, and one or more networks 240.

Base stations 205-1 through 205-*x* (referred to herein as "base station 205" or "base stations 205") may each include a base station of a Public Land Mobile Network (PLMN), or other type of wireless station. Each of base stations 205 may include one or more antenna arrays 210 and control the transmission and reception of data via a wireless interface. Each of base stations 205 may include, for example, a Node B, an Evolved Node B (eNB), or a Next Generation Node B (gNB) of a PLMN (e.g., Third Generation (3G), Fourth Generation (4G), or Fifth Generation (5G) PLMN).

Each base station 205 may, in some implementations, be split into various components and located in a distributed fashion. For example, base station 205 may be split into a base band unit (BBU) and multiple remote radio heads (RRHs), where the BBU may be located at a different location than the RRHs and may connect to the RRHs via, for example, optical fibers. Each BBU includes a network device that operates as the digital function unit that transmits digital baseband signals to the RRHs and receives digital baseband signals from the RRHs. If the BBU is connected to the RRHs via, for example, optical fibers, then the BBU may convert the digital baseband signals into corresponding optical signals for transmission to the RRHs. The BBU may also receive optical signals from the RRHs and convert the optical signals into corresponding digital baseband signals. The RRHs include network devices that operate as radio function units that transmit and receive radio frequency (RF) signals to/from UE devices (e.g., UE device 115). If the RRHs are connected to the BBU via an optical fiber, the RRHs may convert received RF signals to optical signals and transmit the optical signals to the BBU. Additionally, the RRHs may receive optical signals from the BBU via the optic fiber, convert the optical signals to RF signals for transmission via one or more antenna arrays of the RRHs. Each of the RRHs may include at least one antenna array, a transceiver, and other hardware and software components for enabling the RRHs to receive data via wireless RF signals from UE devices 115, and to transmit wireless RF signals to UE devices 215.

Antenna arrays 210 (referred to herein as "antenna array 210" or "antenna arrays 210") may each include an array of antennas, such as, for example, a FD-MIMO or massive MIMO antenna array, that may form antenna beams in horizontal and/or vertical directions to enable each array of antennas to cover a three-dimensional space in the vicinity of each array 210. For example, each antenna array 210 may include a number of horizontal antennas and a number of vertical antennas arranged in a rows-and-columns configuration. As an example, an antenna array 210 may include a 2×4 array with the 2 rows×4 columns of antennas. The antenna arrays 210 shown in FIG. 1 may service a wireless network coverage area 220 within which UEs 215 may transmit to, and receive from, antenna arrays 110 via wireless transmissions. Antenna array 210 may provide reliable wireless connections over area 220 and provide support for a maximum capacity and throughput.

A "cell site," as referred to herein, includes a base station 205, and the antenna arrays 210 to which base station 205 connects and that are used by the base station 205 for transmitting data to UEs 215, and for receiving data from UEs 215. As shown in FIG. 2, base station 205-1 and connected antenna arrays 210 represent cell site 225-1, base station 205-2 and connected antenna arrays 210 represent cell site 225-2, and base station 205-x and connected antenna arrays 210 represent cell site 225-x. Each cell site 225 provides wireless network coverage in a particular geographic area based on the antenna beams of the antennas of each antenna array 210. In particular, as briefly described above, cell sites 225 may correspond to a particular high speed roadway, such as a limited access interstate highway, in which vehicles carrying or embodying UE devices 215 may be traveling. Each antenna of the antenna arrays 210 may form a single beam of radio coverage. In some implementations, each antenna may use a series of antenna elements to form the single beam of radio coverage. As described above, in some implementations, each base station 105 may include multiple distributed components (e.g., a BBU and multiple RRHs).

UE devices 215-1 through 215-y (also referred to herein as "UE 215" or "UEs 215") each includes any type of device having one or more wireless communication interfaces for communicating via antenna arrays 210, base stations 205, and network 240. The UEs 215 may each include, for example, a cellular radiotelephone; a smart phone; a personal digital assistant (PDA); a wearable computer; a Machine-to-Machine (M2M) device; an Internet of Things (IoT) device; a Vehicle-to-Everything (V2X) device, a desktop, laptop, palmtop or tablet computer; or a media player. Each UE 215 may connect to network 240 via a wireless connection. A "user" (not shown in FIG. 2) may be associated with each UE 215, and may be an owner, operator, and/or a permanent or temporary user of the UE 215. Consistent with embodiments described herein, UE 215 may be a mobile communication device capable of operation as part of or traveling in a vehicle traveling at high speeds (e.g., over approximately 50 miles per hour).

Mobility management optimization function 230 may include one or more network devices that performs intelligent processes for optimizing handover processing for UEs 215 and base stations 205. Mobility management optimization function 230 may, for example, perform the processes described below with respect to FIGS. 5-8 to optimize handover processing. Consistent with embodiments described herein, mobility management optimization function 230 may be associated with or incorporated within an access and mobility function (AMF) associated with the portion of the networks 240 connected to cell sites 225.

Networks 240 may include one or more networks of various types, with at least one network including a wireless network, such as, for example, a PLMN or a satellite mobile network. The PLMN may include a Code Division Multiple Access (CDMA) 2000 PLMN, a Global System for Mobile Communications (GSM) PLMN, a Long Term Evolution (LTE) PLMN, and/or other types of PLMNs. In addition to at least one wireless network, network(s) 140 may further include other types of telecommunications network (e.g., Public Switched Telephone Networks (PSTNs)), a wired and/or wireless local area network (LAN), a wired and/or wireless wide area network (WAN), a metropolitan area network (MAN), an intranet, the Internet, and/or a cable network (e.g., an optical cable network).

The configuration of the components of network environment 200 depicted in FIG. 2 is for illustrative purposes only, and other configurations may be implemented. Therefore, network environment 100 may include additional, fewer and/or different components, that may be configured differently, than depicted in FIG. 2.

Figure 3:
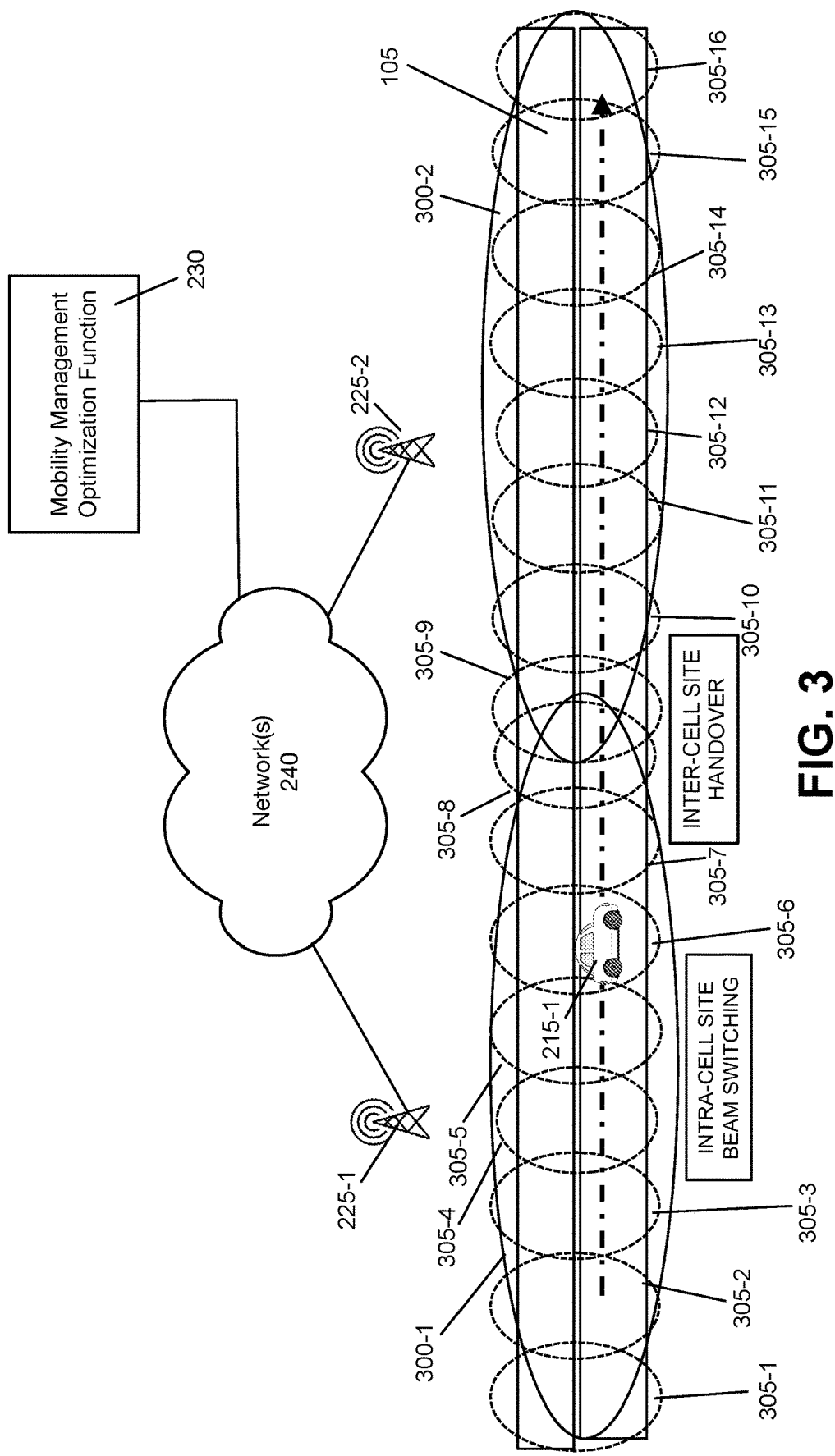
FIG. 3 depicts an example of intra- and inter-cell site handover consistent with implementations described herein.

FIG. 3 depicts an example of intra- and inter-cell site handover consistent with implementations described herein. As shown, FIG. 3 illustrates a portion of roadway 105 serviced by a first cell site 225-1 and a second cell site 225-2, each of which are connected to mobility management optimization function 230 via network(s) 240. Furthermore, FIG. 3 graphically depicts cell site service areas 300-1 and 300-2 associated with each of first cell site 225-1 and second cell site 225-2, respectively (depicted as solid ovals) and beam service areas 305-1 to 305-16 associated with antenna beams provided by cell sites 225 (depicted as dashed ovals). In the example of FIG. 3, each cell site 225 outputs eight antenna beams that cover a portion of roadway 105. As shown, in this example, cell site service areas 300-1 and 300-2 overlap to allow for effective inter-cell site handover from cell site 225-1 to 225-2 without radio link failures. Similarly, each beam service area 305 also overlaps with adjacent beam service areas 305 to allow for intra-cell site handover (i.e., beam switching) within the respective cell site 225. This depiction is simple for descriptive purposes. In an actual environment, the number of antenna beams that service a particular portion of a roadway may be more or fewer and may also have different coverage areas, based on geography, topography, intervening structures, cell site capabilities, etc.

UE device 215-1 (depicted as a vehicle in FIG. 3) is shown as traveling along roadway 105 in a direction from first cell site 225-1 toward second cell site 225-2. Consistent with implementations described herein, mobility management optimization function 230 periodically monitors the location, speed, and direction of travel of UE device 215-1. Mobility management optimization function 230 determines whether UE device 215-1 is on roadway 105 by, for example, mapping the reported location of UE device 225-1 to known coverage areas of cell sites 225. Based on this determination and UE device's 225-1 speed and direction of travel, mobility management optimization function 230 determines whether to apply predictive mobility management consistent with embodiments described herein. For example, if it is determined that the speed of UE device 225-1 exceeds a predetermined threshold or that network utilization and/or congestion exceeds a threshold, predictive mobility management is performed to improve performance and reliability.

As described herein, when mobility management optimization function 230 determines to apply predictive mobility management, a handover schedule for UE device 215-1 is generated. To generate the handover schedule, mobility management optimization function 230 determines a schedule for timing both intra- (beam switching) and inter-cell site handovers based on at least the speed and direction of travel of UE 225-1 as well as current and historical traffic information for roadway 105, such as traffic congestion information, other active users speeds, etc. Once the handover schedule is determined, mobility management optimization function 230 notifies or instructs UE 215-1 to switch beams and or cell sites in accordance with the determined schedule. As described in additional detail below in relation to FIGS. 6-8, handovers executed via a predicted schedule eliminate signaling required by traditional handover mechanisms, thereby improving the speed and reliability of the network.

Figure 4:
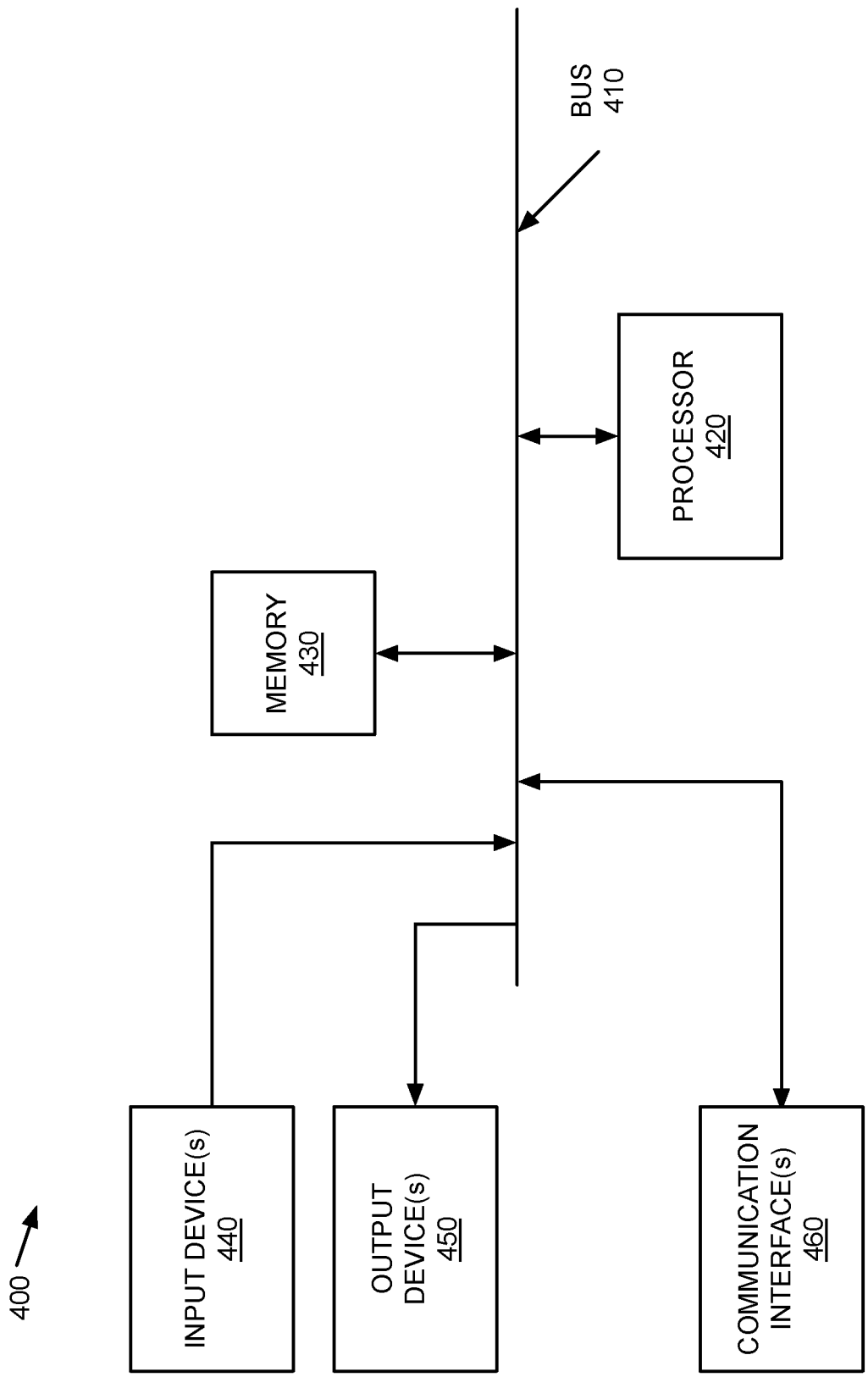
FIG. 4 is a block diagram illustrating example components of a computer device 400 according to one embodiment.

FIG. 4 is a block diagram illustrating example components of a computer device 400 according to one embodiment. UE 215, cell-site 225, and mobility management optimization function 230 may each include one or more computer devices 400. As shown in FIG. 4, computer device 400 may include a bus 410, a processor 420, a memory 430, an input device 440, an output device 450, and a communication interface 460.

Bus 410 includes a path that permits communication among the components of computer device 400. Processor 420 may include any type of single-core processor, multi-core processor, microprocessor, latch-based processor, and/or processing logic (or families of processors, microprocessors, and/or processing logics) that executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, output device 450 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth wireless interface, a radio-frequency identification (RFID) interface, a near-field communications (NFC) wireless interface, and/or any other type of interface that converts data from one form to another form.

Device 400 may perform certain operations relating to optimizing UE handover processing in a wireless network. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Further, in some embodiments, one or more of the components described above may be implemented as virtual components, such as virtual processors, virtual memory, virtual interfaces, etc. Additionally, or alternatively, one or more components of device 400 may perform one or more tasks described as being performed by one or more other components of device 400.

Figure 5:
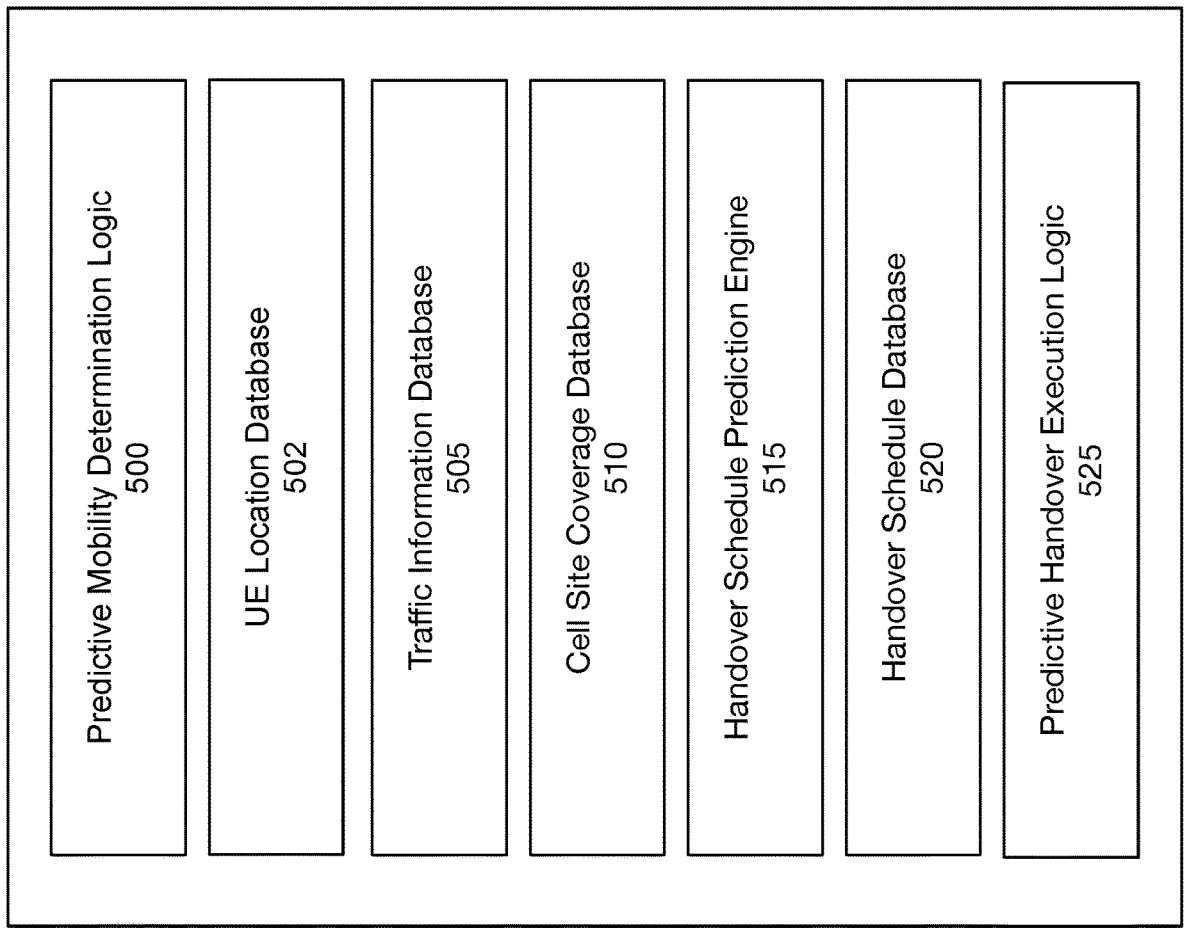
FIG. 5 is a block diagram illustrating exemplary functional components of and information stored in the mobility management optimization function of FIG. 2, according to embodiments described herein.

FIG. 5 is a block diagram illustrating exemplary functional components of and information stored in mobility management optimization function 230 according to embodiments described herein. The components of mobility management optimization function 230 may be implemented, for example, via processor 420 executing instructions from memory 430. Alternatively, some or all of the functional components of mobility management optimization function 230 may be implemented via hard-wired circuitry. The information stored in mobility management optimization function 230 may be stored as a database in memory 430, for example. As shown, mobility management optimization function 230 may include a predictive mobility determination logic 500, UE location database 502, traffic information database 505, cell site coverage database 510, handover schedule prediction engine 515, handover schedule database 520, and predictive handover execution logic 525.

Predictive mobility determination logic 500 includes logic configured to periodically receive information from UE location database 502 that identifies a geographic location of UEs 215 and determine whether to apply predictive mobility management. For example, consistent with embodiments described herein, UEs 215 may be configured to periodically (e.g., every 1-2 seconds) provide location information, such as global positioning satellite (GPS) system location information to network 240. In other implementations, other location determining technology may be used to ascertain a geographic location of UEs 215, such as signal triangulation, etc. The provided location information may be stored and regularly updated in UE location database 502. Predictive mobility determination logic 500 may, based on the UE location information and timestamp information associated therewith stored in database 502, ascertain a speed and direction of travel of UEs 215. Based on the location, speed, and direction of travel, predictive mobility determination logic 500 may determine whether predictive mobility management is appropriate for handling cell site handovers. For example, based on the location, speed, and direction of travel, predictive mobility determination logic 500 may determine that UE is on a high-speed roadway, such as roadway 105, that may require multiple, frequent intra- and/or inter-cell site handovers. Regardless of the outcome of this decision, predictive mobility determination logic 500 may continually receive UE location information, so as to adjust the decision process over time.

Traffic information database 505 may include information indicative of traffic flow along support roadways. For example, traffic information database 505 may include average traffic flow rate information for supported roadways. The information may be broken down by geographic segments and day/time. The average traffic flow rate may be calculated based on both current and historical speed information for UE devices 215 traveling on each roadway. For example, traffic information database 505 may include roadway traffic information provided as a deviation from average or from posted speed limits for each roadway. For example, a particular stretch of roadway during rush hour may have an average deviation of −10 miles per hour over the posted speed limits, while the same stretch of roadway during the mid-day has an average deviation of +10 miles per hour. In some implementations, the data on supported roadways may be broken down based on cell site coverage or based on physical distances. Furthermore, although the term "rush hour" was used above, in some implementations, the average speed may be calculated individually for any prescribed period of time, such as each minute, hour, etc.

Cell site coverage database 510 includes information identifying geographic coverage information for cell sites 225 as well as the coverage zones for each relevant antenna beam associated with each cell site 225. For example, cell site coverage database 510 may include, for each cell site 225 and antenna beam, corresponding coverage zones for a supported roadway. As with the traffic information, coverage zone information may be provided as relative roadway distances (e.g., relative to a starting point of the roadway), or as absolute (e.g., GPS) geographically boundaries. As new cell sites 225 are brought online, or capabilities change, the information in cell site coverage database 510 may be updated to reflect such changes.

Handover schedule prediction engine 515 includes logic for generating or modifying a predictive handover schedule for particular UEs 215. For example, handover schedule prediction engine 515 may be configured to generate a predictive handover schedule based on the location and speed information for a particular UE 215, the traffic information stored in traffic information database 505, and the cell site coverage information stored in cell site coverage database 510. For example, in some implementations, handover schedule prediction engine 515 may be configured to schedule network-enforced handovers based on the speed of UE 215, the predicted speed deviation at each handover location based on the traffic information, the locations of the beam, and cell site coverage areas. The predictive handover schedule may be stored in handover schedule database 520 for use in executing or implementing the identified schedule.

By way of example, handover schedule prediction engine 515 retrieves, for each UE 215, instances of location and at various times (t), including predictive times. Such information may take the form:

$UE_i = \{\{t_0, \{x_0, y_0\}, \{v_{x0}, v_{y0}\}\}, \{t_1, \{x_1, y_1\}, \{v_{x1}, v_{y1}\}\}, \ldots, \{t_n, \{x_n, y_n\}, \{v_{xn}, v_{yn}\}\}\}$, where i denotes the individual UE (in a set of UEs), x and y denote the location of the UE and may correspond to, for example, latitude and longitude values, $v_x$ and $v_y$ denote the speed in the x and y directions, and the subscripts (0-n) denote that values at the particular time instances. As described above, such times instances include instances in the future, for which the handover schedule is to be generated. The predicted future locations and speed values for each UE may be adjusted based on information retrieved by traffic information database 505.

In addition to instances of UE location and speed, handover schedule prediction engine 515 may also retrieve cell site coverage information from cell site coverage database 510. For example, for each beam and cell site, coverage value may be expressed in terms of locations, or a range of locations.

Based on the actual and predicted UE location and speed information and the cell site coverage location information, handover schedule prediction engine 515 may output, for each UE, cell site and beam information for each time instance. In some examples, this output may take the form:

$UE_i = \{\{t_0, C_0, B_0\}, \{t_0, C_1, B_1\}, \{t_2, C_2, B_2\}, \ldots, \{t_n, C_n, B_n\}\}$, where C and B refer to the cell site and beam IDs for the respective times.

Predictive handover execution logic 525 includes logic for signaling cell sites 225 to initiate intra- or inter-cell site handover processing based on information included in the predictive handover schedule, as stored in handover schedule database 520. For example, for beam switching intra-cell site handovers (e.g., time instances in the predictive handover schedule in which the beam ID changes, but cell site ID does not), predictive handover execution logic 525 may transmit instructions to a cell site to switch beams for UE 215 at the time designated in the predictive handover schedule. Similarly, for inter-cell site handovers (e.g., time instances in the predictive handover schedule in which the cell site ID changes), predictive handover execution logic 525 may transmit instructions to a cell site to handover UE 215 to a designated target cell site at the time designated in the predictive handover schedule.

Figure 6:
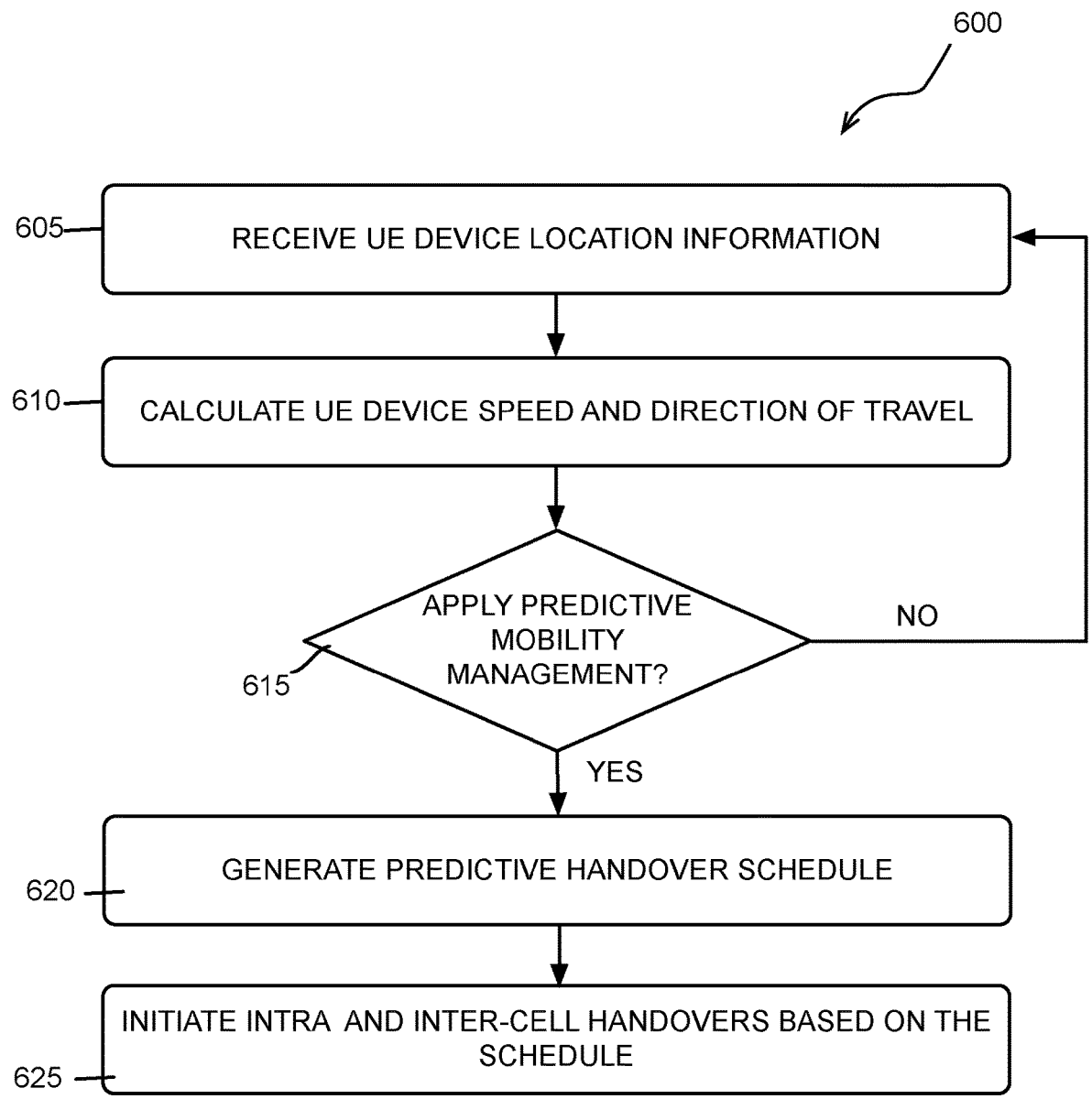
FIG. 6 is a flow diagram of an exemplary process for optimizing mobility management consistent with embodiments described herein.

FIG. 6 is a flow diagram of an exemplary process 600 for optimizing mobility management consistent with embodiments described herein. The exemplary process of FIG. 6 may be implemented by mobility management optimization function 230, in conjunction with cell sites 225 and intervening network components.

The exemplary process includes mobility management optimization function 230 periodically receiving or retrieving location information for a UE 215 (block 605). For example, as described above, UE 215 may periodically provide location information, such as GPS location information, to network 240 for use in providing network services. Based on the received location information and time information associated therewith, mobility management optimization function 230 may calculate speed and direction of travel information for UE 215, using, for example, time and location data (block 610).

Using the location, speed, and direction of travel information, mobility management optimization function 230 may determine whether to apply predictive mobility management to UE 215 (block 615). For example, mobility management optimization function 230 may determine that the location, speed, and direction of travel information indicates that UE 215 is on or is entering a high-speed roadway or other transportation venue (e.g., railway, subway, etc.), which may cause frequent intra- and inter-cell handovers.

If mobility management optimization function 230 determines not to apply predictive mobility management (block 615—NO), process 600 returns to block 605 for subsequent location information reception. However, when mobility management optimization function 230 determines that predictive mobility management is to be applied (block 615—YES), mobility management optimization function 230 generates a predictive handover schedule for UE 215 (block 620). For example, mobility management optimization function 230 may predict intra-(beam switching) and inter-cell site handover timings based on the location, speed, and direction of travel information, as well as cell site coverage information for other cell sites 225 (e.g., cell sites proximate to the high-speed roadway) in network 240 for which predictive mobility management may be applied, such as cell sites 225 proximate to the high-speed roadway. As described above, cell site coverage information may be retrieved from cell site coverage database 510.

In some implementations, the predictive handover schedule may further be based on current or historical traffic information associated with the predicted path of UE 215. As described above, traffic information database 505 may store information indicative of speeds of UE devices at particular times and locations. This information may be used by mobility management optimization function 230 to predict likely changes in speed of UE device 215 that may affect the schedule for predicted handovers. In still other implementations, historical travel information of UE device 215 may be used to generate the predicted handover schedule, or whether to resume traditional handover processing. For example, assume that UE device 215 regularly travels high-speed roadway between defined locations (e.g., home and work) at particular times (or time ranges) and days. Mobility management optimization function 230 may use information regarding such historical travel patterns to predict likely destination location for the predictive mobility management processing. In still further embodiments, mobility management optimization function 230 may modify or adapt the predictive handover schedule, based on dynamic changes to traffic information, user device location or speed, or a combination thereof. Consistent with embodiments described herein, the predictive handover schedule may identify the particular beam switching and cell site handover timings for UE 215.

Figure 7:
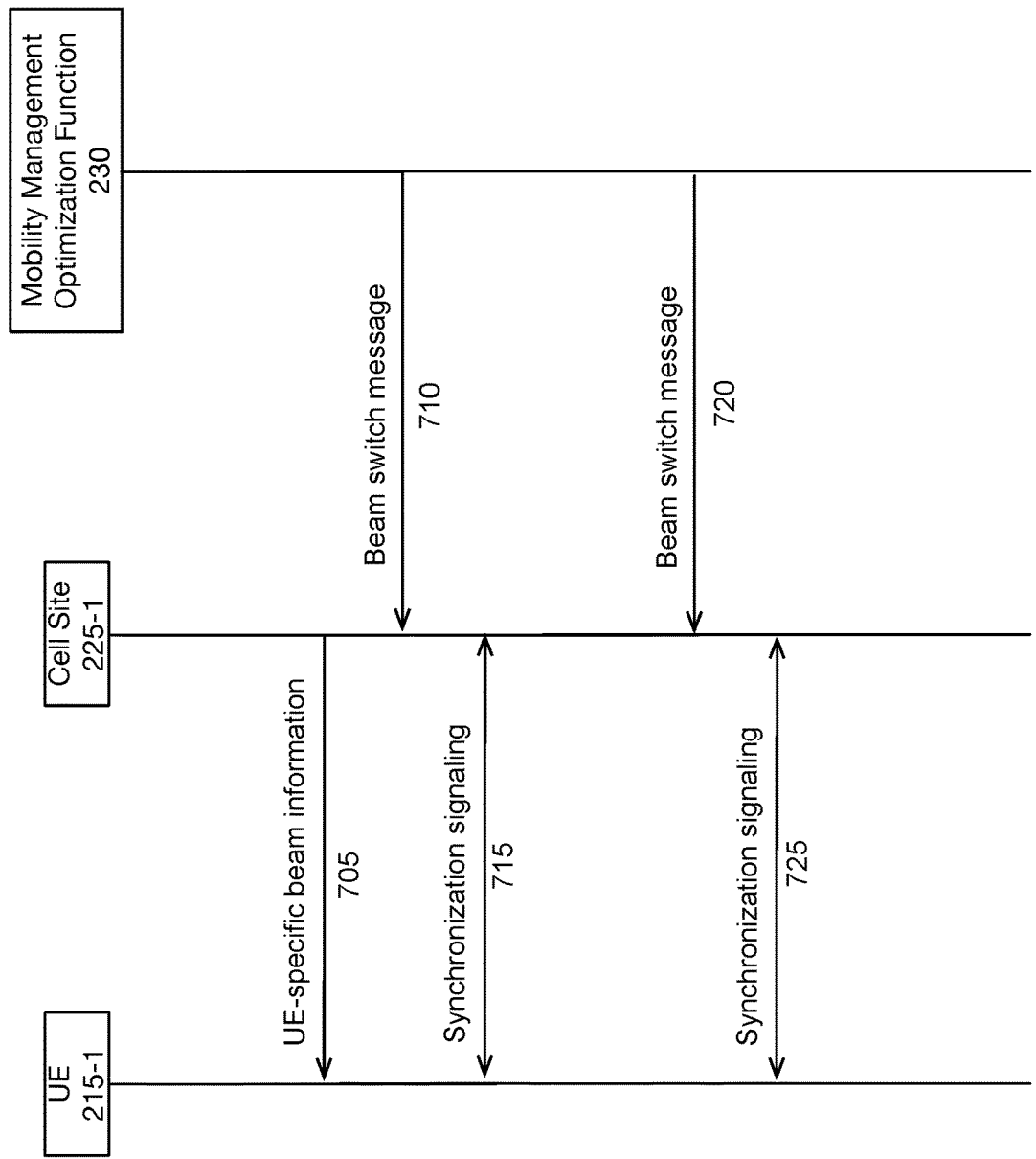
FIG. 7 is a signal diagram illustrating exemplary processing of schedule-based beam switching consistent with embodiments described herein.

Next, mobility management optimization function 230 may initiate intra- and inter-cell site handovers at the times identified in the predictive handover schedule (block 625). For example, mobility management optimization function 230 may signal a cell site 225 to switch beams for UE 215 at particular times based on the generated predictive handover schedule. FIG. 7 is a signal diagram illustrating exemplary processing of such a schedule-based beam switching between a series of beams following initial RACH (random access channel) beam selection by UE (prior to initiation of predictive mobility management).

As shown in FIG. 7, a cell site 225-1 transmits UE-specific beam information (705) to UE 215-1 via the initially selected beam. Based on the predictive handover schedule, mobility management optimization function 230 transmits a beam switch message (710) to cell site 225-1 identifying a next beam to which the UE 215-1 is to use. UE 215-1 and cell site 225-1 then perform signal synchronization (715) to affect the handover of UE 215-1 to the identified beam. For example, UE 215-1 and cell site 225-1 may exchange primary and secondary synchronization signals, a primary broadcast channel (PBCH) signal, etc.

At a next time instance that includes a beam change as identified in the predictive handover schedule, mobility management optimization function 230 transmits another beam switch message (720) to cell site 225-1 identifying a next beam to which the UE 215-1 is to use. UE 215-1 and cell site 225-1 then perform signal synchronization (725) to affect the handover of UE 215-1 to the identified beam. This process continues until the predictive handover schedule indicates that no additional beams are scheduled on cell site 225-1, as indicated, for example, by a cell site ID change instance in the predictive handover schedule. In contrast to traditional beam switching processing, the above-described process does not require beam measurement information to be shared or negotiated between UE 215-1 and cell site 225-1 prior to beam switching. Rather, the identity of the new beam is provided to cell site 225-1 by mobility management optimization function 230.

Figure 8:
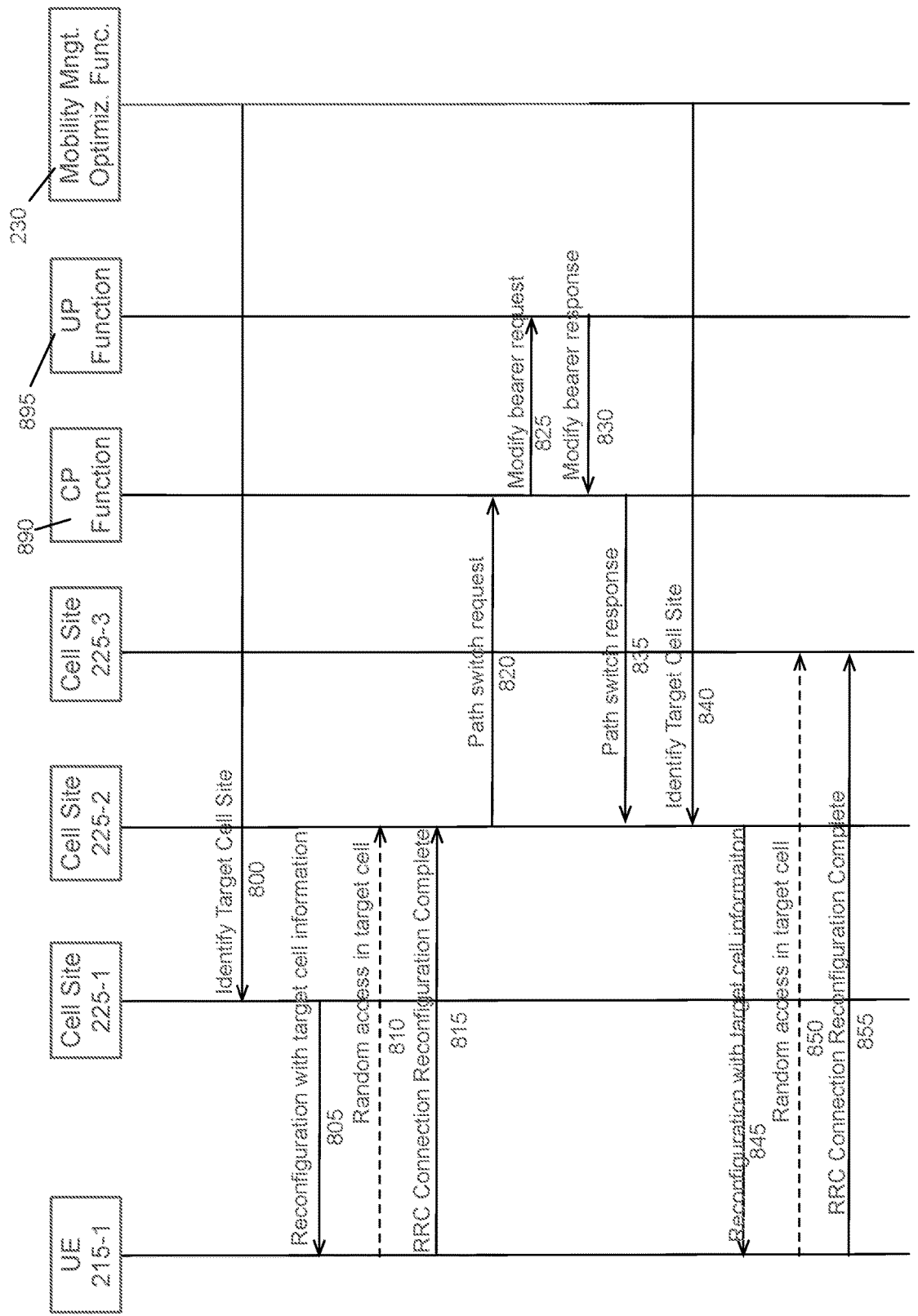
FIG. 8 is a signal diagram illustrating exemplary processing of the schedule-based inter-cell site handover consistent with embodiments described herein.

Returning to FIG. 6, in addition to intra-cell site handovers (beam switching), the predictive handover schedule may also indicate the times and particular inter-cell site handovers for UE 215-1, e.g., instances in the predictive handover schedule that indicate a cell site ID change. FIG. 8 is a signal diagram illustrating exemplary processing of such a schedule-based inter-cell site handover consistent with embodiments described herein. As shown in FIG. 8, mobility management optimization function 230 transmits a handover message (800) to source cell site 225-1. For example, handover message 800 may identify target cell site 225-2 toward which UE 215-1 is moving. In response, source cell site 225-1 transmits a reconfiguration message (805), to UE 215-1 that identifies the target cell site 225-2. UE 215-1 then performs random access (810) and radio resource control (RRC) configuration (815) with target cell site 225-2 to affect the handover to target cell site 225-2. Target cell site 225-2 in response to the handover, transmits a path switch request (820) to control plane function 890, which transmits a modify bearer request (825) to user plane function 895. User plane function 890 and control plane function 895 transmit appropriate responses (830/835).

At a next time instance that includes a cell site change as identified in the predictive handover schedule, mobility management optimization function 230 transmits another handover message (840) to cell site 225-2. For example, handover message 840 may identify a next cell site 225-3 toward which UE 215-1 is moving. In response, cell site 225-2 transmits a reconfiguration message (845), to UE 215-1 that identifies the target cell site 225-3. UE 215-1 then performs random access (850) and radio resource control (RRC) configuration (855) with target cell site 225-3 to effect the handover to target cell site 225-3. Although not depicted in FIG. 8, cell site 225-3 in response to the handover may perform additional processing as described above to effect a handover from cell site 225-2 to cell site 225-3. This process may continue until the predictive handover schedule indicates that no additional cell sites 225 are included in the predictive scheduled on cell site 225-1. In contrast to traditional inter-cell site handover processing, the above-described process does not require measurement information, such as beam reference signal (BRS) measurement information for each of a source cell site and a target cell site. Rather, the identity of all target cell sites are provided and directed by mobility management optimization function 230.

The foregoing description of implementations provides illustration and description but is not intended to be exhaustive or to limit the invention to the precise form disclosed. Modifications and variations are possible in light of the above teachings or may be acquired from practice of the invention. For example, while series of blocks and signal messages have been described with respect to FIGS. 6, 7, and 8, the order of the blocks and signal messages may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network function executing on a service provider network, geographic location information associated with a user equipment device (UE), wherein the UE is associated with a vehicle;
generating, by the network function, a predictive handover schedule based on the received location information; and
initiating, by the network function, handover processing based on the predictive handover schedule,
wherein initiating the handover processing comprises:
transmitting, at times based on the predictive handover schedule, a handover initiation message to each of a plurality of cell sites in the service provider wireless network,
wherein, upon receipt of a respective handover initiation message, each cell site initiates handover processing based on the received handover initiation message.

2. The method of claim 1, wherein receiving the geographic location information comprises periodically receiving global positioning system (GPS) location information associated with the UE.

3. The method of claim 1, further comprises:
calculating a speed and direction of travel of the UE based on the received geographic location information; and
determining whether to apply predictive mobility management based on the location information, speed, and direction of travel.

4. The method of claim 3, wherein generating the predictive handover schedule further comprises:
generating the predictive handover schedule based on the location information, speed, direction of travel information, cell site coverage information, and traffic information.

5. The method of claim 4, wherein the cell site coverage information comprises identification, geographic coverage, and capabilities information for the plurality of cell sites.

6. The method of claim 5, wherein each of the plurality of cell sites comprises a next generation node B (gNB) capable of operating in the millimeter wave (mmWave) spectrum and wherein the service provider wireless network comprises a fifth generation (5G) public land mobile network (PLMN).

7. The method of claim 6, wherein the cell site coverage information further comprises antenna beam coverage information for each respective antenna beam associated with a particular cell site in the plurality of cell sites.

8. The method of claim 7, wherein the predictive handover schedule identifies predicted timings for inter-cell site handovers and beam switching handovers.

9. The method of claim 8, wherein transmitting the one or more handover initiation messages, for beam switching handovers, comprises transmitting a beam switch message to a cell site, wherein the beam switch messages identifies a beam to which the UE is to switch to.

10. The method of claim 8, wherein transmitting the one or more handover initiation messages, for inter-cell site handovers, comprises transmitting a target cell site identification message to a cell site currently serving the UE.

11. A network function executing on a service provider network, comprising:
a communication interface configured to:
receive geographic location information associated with a user equipment device (UE), wherein the UE is associated with a vehicle; and a processing unit configured to:
  generate a predictive handover schedule based on the received location information; and
  initiate handover processing based on the predictive handover schedule,
  wherein the processing unit configured to initiate the handover processing is further configured to:
    transmit, at times based on the predictive handover schedule, a handover initiation message to each of a plurality of cell sites in the service provider wireless network,
    wherein, upon receipt of a respective handover initiation message, each cell site initiates handover processing based on the received handover initiation message.

12. The network function of claim 11, wherein the communication interface is further configured to periodically receive global positioning system (GPS) location information associated with the UE.

13. The network function of claim 11, wherein the processing unit is further configured to:
  calculate a speed and direction of travel of the UE based on the received geographic location information; and
  determine whether to apply predictive mobility management based on the location information, speed, and direction of travel.

14. The network function of claim 13, wherein the processing unit configured to generate the predictive handover schedule is further configured to:
  generate the predictive handover schedule based on the location information, speed, and direction of travel, cell site coverage information, and traffic information.

15. The network function of claim 14, wherein the cell site coverage information comprises identification, geographic coverage, and capabilities information for the plurality of cell sites.

16. The network function of claim 15, wherein the cell site coverage information further comprises antenna beam coverage information for each respective antenna beam associated with a particular cell site in the plurality of cell sites.

17. A non-transitory storage medium storing instructions executable by a network function executing on a service provider network, wherein the instructions comprise instructions to cause the network function to:
  receive geographic location information associated with a user equipment device (UE), wherein the UE is associated with a vehicle;
  generate a predictive handover schedule based on the received location information; and
  initiate handover processing based on the predictive handover schedule,
  wherein the instructions to cause the network device to initiate the handover processing further cause the network device to:
    transmit, at times based on the predictive handover schedule, a handover initiation message to each of a plurality of cell sites in the service provider wireless network,
    wherein, upon receipt of a respective handover initiation message, each cell site initiates handover processing based on the received handover initiation message.

18. The non-transitory storage medium of claim 17, wherein the instruction further comprise instructions to cause the network device to:
  calculate a speed and direction of travel of the UE based on the received geographic location information; and
  determine whether to apply predictive mobility management based on the location information, speed, and direction of travel.

19. The non-transitory storage medium of claim 18, wherein the instructions to cause the network device to generate the predictive handover schedule further comprises instructions to:
  generate the predictive handover schedule based on the location information, speed, and direction of travel, cell site coverage information, and traffic information.

20. The non-transitory storage medium of claim 19, wherein the cell site coverage information comprises identification, geographic coverage, and capabilities information for the plurality of cell sites,
  wherein each of the plurality of cell sites comprises a next generation node B (gNB) capable of operating in the millimeter wave (mmWave) spectrum and wherein the service provider wireless network comprises a fifth generation (5G) public land mobile network (PLMN), and
  wherein the cell site coverage information further comprises antenna beam coverage information for each respective antenna beam associated with a particular cell site in the plurality of cell sites.

* * * * *